(12) United States Patent
Okazaki et al.

(10) Patent No.: US 7,667,358 B2
(45) Date of Patent: Feb. 23, 2010

(54) COOLING STRUCTURE OF SUPERCONDUCTING MOTOR

(75) Inventors: Toru Okazaki, Osaka (JP); Shingo Ohashi, Osaka (JP); Hidehiko Sugimoto, Fukui (JP); Toshio Takeda, Tokyo (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 293 days.

(21) Appl. No.: 11/793,681

(22) PCT Filed: Dec. 16, 2005

(86) PCT No.: PCT/JP2005/023125
§ 371 (c)(1),
(2), (4) Date: Aug. 22, 2007

(87) PCT Pub. No.: WO2006/068040
PCT Pub. Date: Jun. 29, 2006

(65) Prior Publication Data
US 2007/0296287 A1    Dec. 27, 2007

(30) Foreign Application Priority Data
Dec. 24, 2004    (JP) .............................. 2004-374707

(51) Int. Cl.
*H02K 55/04* (2006.01)
*H02K 3/24* (2006.01)
*H02K 9/10* (2006.01)
*H02K 9/00* (2006.01)

(52) U.S. Cl. .............................. 310/54; 310/52; 310/55; 310/61

(58) Field of Classification Search .................. 310/52, 310/54–55, 61
See application file for complete search history.

(56) References Cited

U.S. PATENT DOCUMENTS

| | | | | |
|---|---|---|---|---|
| 3,009,072 A | * | 11/1961 | Mossay | 310/57 |
| 4,101,793 A | * | 7/1978 | Berthet et al. | 310/52 |
| 4,208,598 A | * | 6/1980 | Popov et al. | 310/64 |
| 2008/0303359 A1 | * | 12/2008 | Oestreich | 310/54 |

FOREIGN PATENT DOCUMENTS

| | | |
|---|---|---|
| JP | 6-6907 A | 1/1994 |
| JP | 10-215561 A | 8/1998 |
| JP | 10-285905 A | 10/1998 |
| JP | 2002-58207 A | 2/2002 |
| JP | 2003-33000 A | 1/2003 |
| JP | 2003-224961 A | 8/2003 |

OTHER PUBLICATIONS

International Search Report, PCT/JP2005/023125 (Jan. 17, 2006) (2 pgs.).

* cited by examiner

*Primary Examiner*—Burton Mullins
(74) *Attorney, Agent, or Firm*—Foley & Lardner LLP

(57) ABSTRACT

In a cooling structure of a superconducting motor in which a superconducting coil is attached to a rotor, grooves are concavely provided on an outer surface of a rotating shaft that penetrates and is fixed to the rotor. A refrigerant is circulated through a refrigerant circulation pipe disposed inside the grooves to that the superconducting coil is cooled by the refrigerant.

7 Claims, 8 Drawing Sheets

US 7,667,358 B2

COOLING STRUCTURE OF SUPERCONDUCTING MOTOR

This is a U.S. National Stage application of PCT/JP2005/023125, filed Dec. 16, 2005, which claims priority to Japanese application 2004-374707, filed Dec. 24, 2004, the disclosures of which are both incorporated herein in their entirety by reference.

TECHNICAL FIELD

The present invention relates to a cooling structure of a superconducting motor. More specifically, the present invention relates to a structure for efficiently cooling a superconducting coil attached to a rotor of a drive motor mounted on ships, such as a government ship and a passenger ship.

BACKGROUND ART

In recent years, the development of a ship driven by electrically driving a motor has been advanced in view of suppressing a depletion of fuel resources, such as a gasoline, and an environmental deterioration due to exhaust gas. Specifically, a superconducting motor disclosed in JP-A-6-006907 (Patent Document 1) may be employed, thereby eliminating copper loss in a superconducting coil and achieving high efficiency. Additionally, a miniaturization of the motor itself and a high-power output can be achieved.

Meanwhile, when driving a superconducting motor, a superconducting coil is required to be cooled to an ultra-low temperature (e.g., 77 kelvins). Thus, means for cooling is especially important, and a simple and efficient cooling structure is being required.

Particularly, when cooling a superconducting coil attached to a rotor disposed at a center of a motor, it is inefficient to cool it from outside the motor. Therefore, it is difficult to sufficiently cool the superconducting coil in such a case.

JP-A-2002-58207 (Patent Document 2) provides a structure in which a hollow portion is formed through a rotating shaft of a motor and a refrigerant is passed through the hollow portion to cool a coil attached to a rotor. This structure enables an efficient cooling of the coil attached to the rotor to a necessary temperature even in a case where the coil attached to the rotor is a superconducting coil.

However, in the structure disclosed in Patent Document 2, a center of the rotating shaft needs to be drilled to form the hollow portion. Particularly, in a case of a large motor, such as a series-coupled synchronous type motor used to drive a ship, it is difficult to form a long hollow portion through a long rotating shaft.

Patent Document 1: JP-A-6-6907
Patent Document 2: JP-A-2002-58207

DISCLOSURE OF THE INVENTION

Problems to be Solved by the Invention

The present invention has been made in view of the above problems, and it is an object thereof to provide a simple cooling structure of a superconducting motor which can efficiently cool a superconducting coil attached to a rotor.

Means for Solving the Problems

To solve the above problems, the present invention provides a cooling structure of a superconducting motor having a superconducting coil attached to a rotor, the cooling structure comprising:

a rotating shaft penetrating through and fixed to the rotor; and a refrigerant circulation tube through which a refrigerant for cooling the superconducting coil circulates, wherein a groove is formed on an outer surface of the rotating shaft, and the refrigerant circulation path is disposed inside the groove.

According to the above configuration, the groove is provided on the outer surface of the rotating shaft instead of providing a hollow portion through a center of the rotating shaft, and the refrigerant circulation tube is disposed inside the groove. Thus, the cooling structure can easily be provided, as compared with the case where the hollow portion is provided through the rotating shaft.

As the motor becomes large, the rotating shaft becomes long accordingly, and it becomes more difficult to form a long hollow portion through a center of the rotating shaft. Therefore, the cooling structure of the present invention may be suitably employed in a large superconducting motor in particular.

Also, since the refrigerant circulation tube is disposed inside the groove and is exposed to an outer side of the rotating shaft, the refrigerant circulation tube can be brought into a direct contact with the rotor and can be placed close to the superconducting coil attached to the rotor. Consequently, cooling effect can be enhanced as compared with the case where the refrigerant circulation tube is provided on a center line of the rotating shaft.

A material of the superconducting coil may be bismuth-based or yttrium-based high-temperature superconducting materials.

The refrigerant circulation tube may include:

a first pipe having a first outgoing path section and a first returning path section that are coupled to a supply source of the refrigerant for cooling the superconducting coil;

a second pipe having a second outgoing path section communicated with the first outgoing path section of the first pipe and a second returning path section communicated with the first returning path section of the first pipe, wherein the second pipe is fixed to an axial end of the rotating shaft and is rotatably coupled to the first pipe; and a refrigerant circulation pipe having a third outgoing path section communicated with the second outgoing path section of the second pipe and a third returning path section communicated with the second returning path section of the second pipe.

According to the above configuration, the refrigerant for cooling the superconducting coil is circulated from the supply source to the first outgoing path section of the first pipe, the second outgoing path section of the second pipe, the refrigerant circulation pipe, the first returning path section of the second pipe, and the returning path section of the first pipe in this order, whereby the superconducting coil attached to the rotor can be cooled by the refrigerant circulated through the refrigerant circulation pipe that is disposed inside the groove of the rotating shaft.

The groove may include a first longitudinal groove section, a second longitudinal groove section, and a coupling groove section, the first longitudinal groove section and the second longitudinal groove section are formed along an axial direction of the rotating shaft at symmetric positions with respect to an axis of the rotating shaft, the coupling groove section is formed along a circumferential surface of the rotating shaft at a front end position of the rotating shaft, wherein the refrigerant circulation pipe may further have a turnaround section which is disposed inside the coupling groove section and couples the third outgoing path section and the third returning path section.

The above configuration can be easily implemented only by forming the groove on the outer surface of the rotating shaft and arranging the refrigerant circulation pipe within the groove. Thus, the manufacturing efficiency of the superconducting motor can be enhanced a cost can be reduced.

In a case where it is required to further enhance the cooling effect, the groove inside which the refrigerant circulation pipe is disposed may be formed spirally along a circumferential direction other than along the axial direction of the rotating shaft, and for example, a refrigerant circulation pipe of an accordion-type that is flexible may be disposed so as to be wound around the rotating shaft, whereby a length of the refrigerant circulation pipe becomes long. Thus, the superconducting coil can efficiently be cooled in a wide range in the circumferential direction thereof.

In order to prevent the temperature of the refrigerant from rising, circumferential surfaces of the first pipe and the second pipe may be surrounded by heat-insulating means in a region other than a region in which the rotor is disposed.

The heat insulating means maybe implemented by surrounding the first pipe and the second pipe with an outer tube and providing a vacuum heat-insulating layer inside the outer tube. Alternatively, the first pipe and the second pipe may be covered by an adiabatic material.

The first pipe is coupled to the supply source of the refrigerant so that the first pipe is fixed, while the second pipe is attached to the rotating shaft so that the second pipe rotates. Therefore, the first pipe and the second pipe needs to be rotatably coupled.

According to the present invention, a first flange projected from a coupling end of the first pipe and a second flange projected from a coupling end of the second pipe may be provided, wherein the first and the second flanges are rotatably in contact with each other, and spring means for biasing the first and the second flanges in respective contacting directions may be provided.

According to the above configuration, even when the first pipe and the second pipe are somewhat misaligned, an opening in the misaligned coupling end of one of the pipes is covered by the flange corresponding to the other pipe. Thus, the refrigerant can be prevented from leaking. Moreover, the flanges contacting against each other are pushed by the spring means in their contacting directions. Thus, a gap between the flanges that are contacting each other can be eliminated, thereby preventing the refrigerant leakage.

As the refrigerant for cooling the superconducting coil, liquid nitrogen, neon, or helium may be used.

When the liquid nitrogen is used as the refrigerant, the superconducting coil can be cooled to an ultra-low temperature at which the superconducting coil is in a superconducting state.

Liquid nitrogen, whose temperature has been raised by cooling the superconducting coil, can be reused as the refrigerant by being cooled by another cooling unit. In a case where liquid nitrogen is vaporized, the vaporized liquid nitrogen may be externally discharged.

The superconducting motor may be either an axial type in which stators are disposed opposite to each other in the axial direction of the rotor so that a direction of a magnetic flux of the superconducting coil is directed in the axial direction, or a radial type in which the rotor is provided inside a hollow portion of a stator having an annular cross section so that the direction of the magnetic flux of the superconducting coil is directed in a radial direction.

In a case where the superconducting motor is the axial type, the refrigerant circulation pipe disposed inside the groove on the outer surface of the rotating shaft can be drawn out from the groove in the vicinity of the rotor so as to extend along a side surface of the rotor toward the vicinity of the superconducting coil attached to the rotor. Thus, the refrigerant circulation pipe can be disposed in the vicinity of the superconducting coil so that the cooling effect to the superconducting coil can be enhanced.

Advantages of the Invention

As described above, according to the present invention, the cooling structure for cooling the superconducting coil attached to the rotor is provided by forming the groove on the outer surface of the rotating shaft and disposing the refrigerant circulation tube inside the groove, instead of forming a hollow portion at the center of the rotating shaft. Thus, the cooling structure can easily be formed, as compared with the case where the hollow portion is provided in the rotating shaft.

Also, the refrigerant circulation tube is exposed to the outer surface of the rotating shaft. Thus, the refrigerant can be circulated at a position closer to the superconducting coil attached to the rotor than the case where a refrigerant circulation is provided on the center line of the rotating shaft. Consequently, cooling effect can be enhanced.

DESCRIPTION OF REFERENCE NUMERALS AND SIGNS

Figure 1:
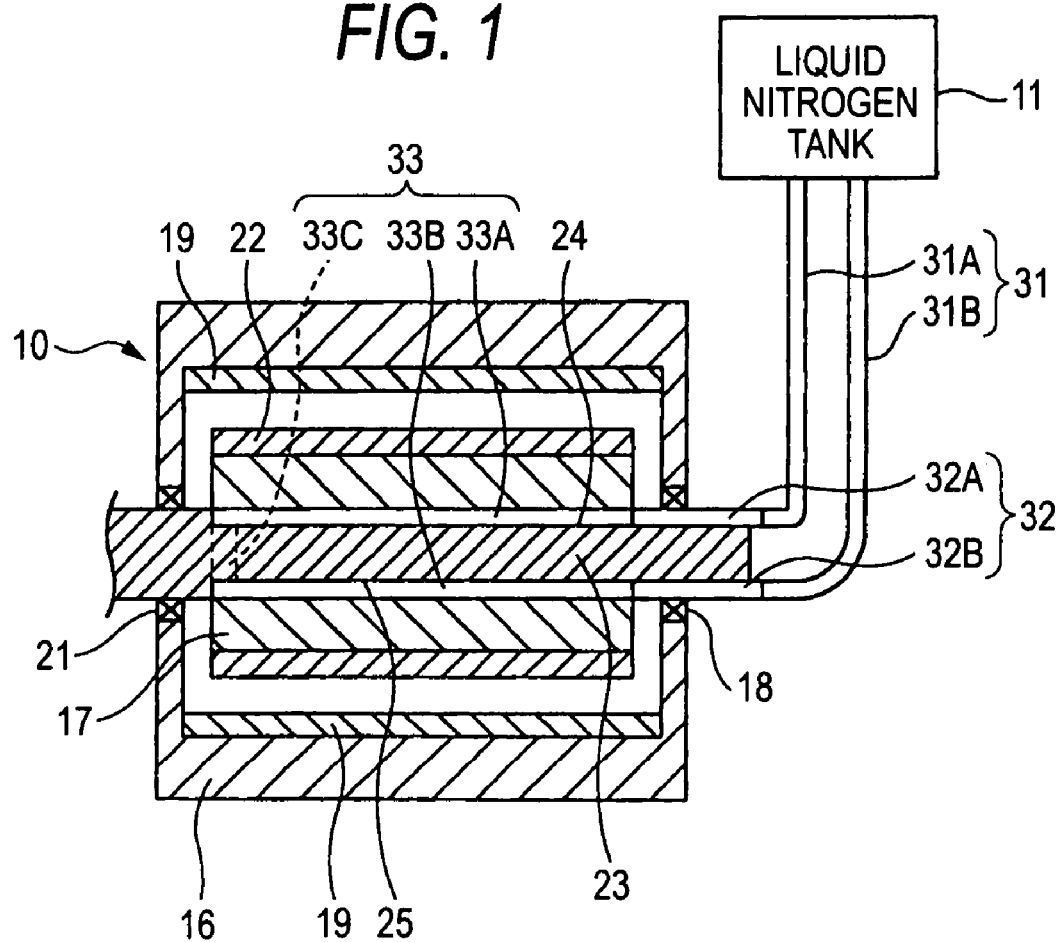
FIG. 1 is a schematic sectional view of a superconducting motor according to a first embodiment of the invention.

10 superconducting motor
16 stator
17 rotor
19 armature coil
22 superconducting coil
23 rotating shaft
24, 25, 26 grooves
31 first pipe
31A first outgoing path section
31A-1 first flange
31B first returning path section
31B-1 first flange
32 second pipe 32A second outgoing path section
32A-1 second flange
32B second returning path section
32B-1 second flange
33 refrigerant circulation pipe
33A third outgoing path section
33B third returning path section
33C turnaround section

BEST MODE FOR CARRYING OUT THE INVENTION

Embodiments of the present invention will be described with reference to the drawings.

FIGS. 1 to 4 show a first embodiment of the invention. A superconducting motor 10 may be used as a propulsion motor of a ship.

Figure 2:
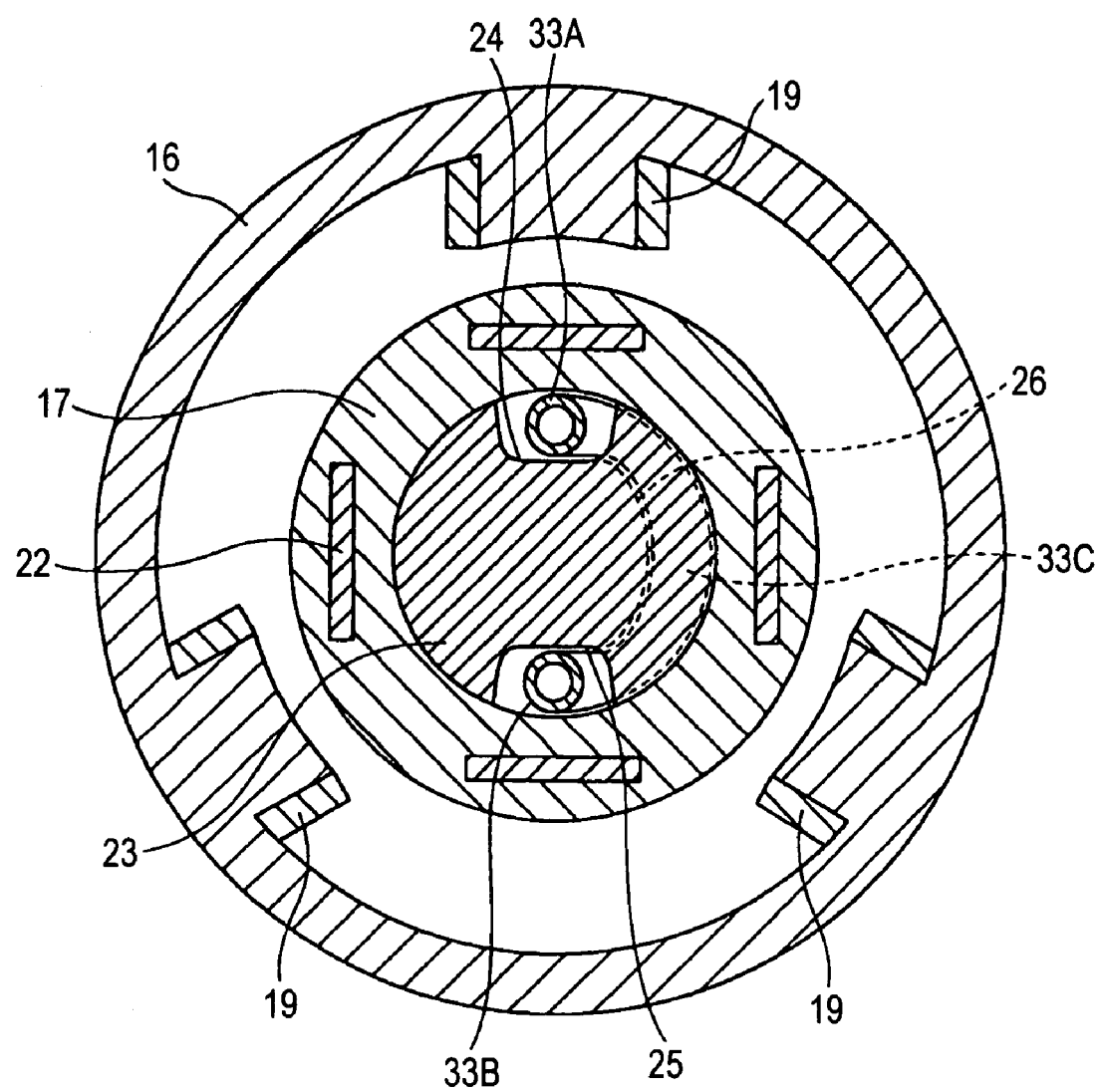
FIG. 2 is a cross-sectional view of the superconducting motor.

As shown in FIGS. 1 and 2, the superconducting motor 10 includes a stator 16 and a rotor 17 which is rotatably disposed inside a hollow portion of the stator 16, and it is a radial type in which a direction of a magnetic flux of a superconducting coil 22 attached to the rotor 17 is directed in a radial direction.

The rotor 17 is formed in a cylindrical shape, and may be made of a powder magnetic material. A rotating shaft 23 penetrates through a center of the rotor 17 and is fixed thereto. The rotating shaft 23 extends towards the exterior of the stator 16 through bearings 18 and 21.

The superconducting coil 22 (or field coil) made of a superconducting material is fixed to the rotor 17. As the superconducting material, bismuth-based or yttrium-based high temperature superconducting materials may be suitably used.

On the other hand, the stator 16 may be formed of a powder magnetic material such as an iron powder on which insulating coating is applied. As shown in FIG. 2, the stator 16 has a cross section of an annular shape. Armature coils 19 formed by a normal conducting material such as copper wires, and are attached onto an inner circumferential surface of the stator 16 at angular intervals of 120 degrees in a circumferential direction. Three-phase alternating currents that are phase-shifted from one another are supplied to the respective armature coils 19 to generate a rotating magnetic field, thereby rotating the rotor 17.

Figure 3:
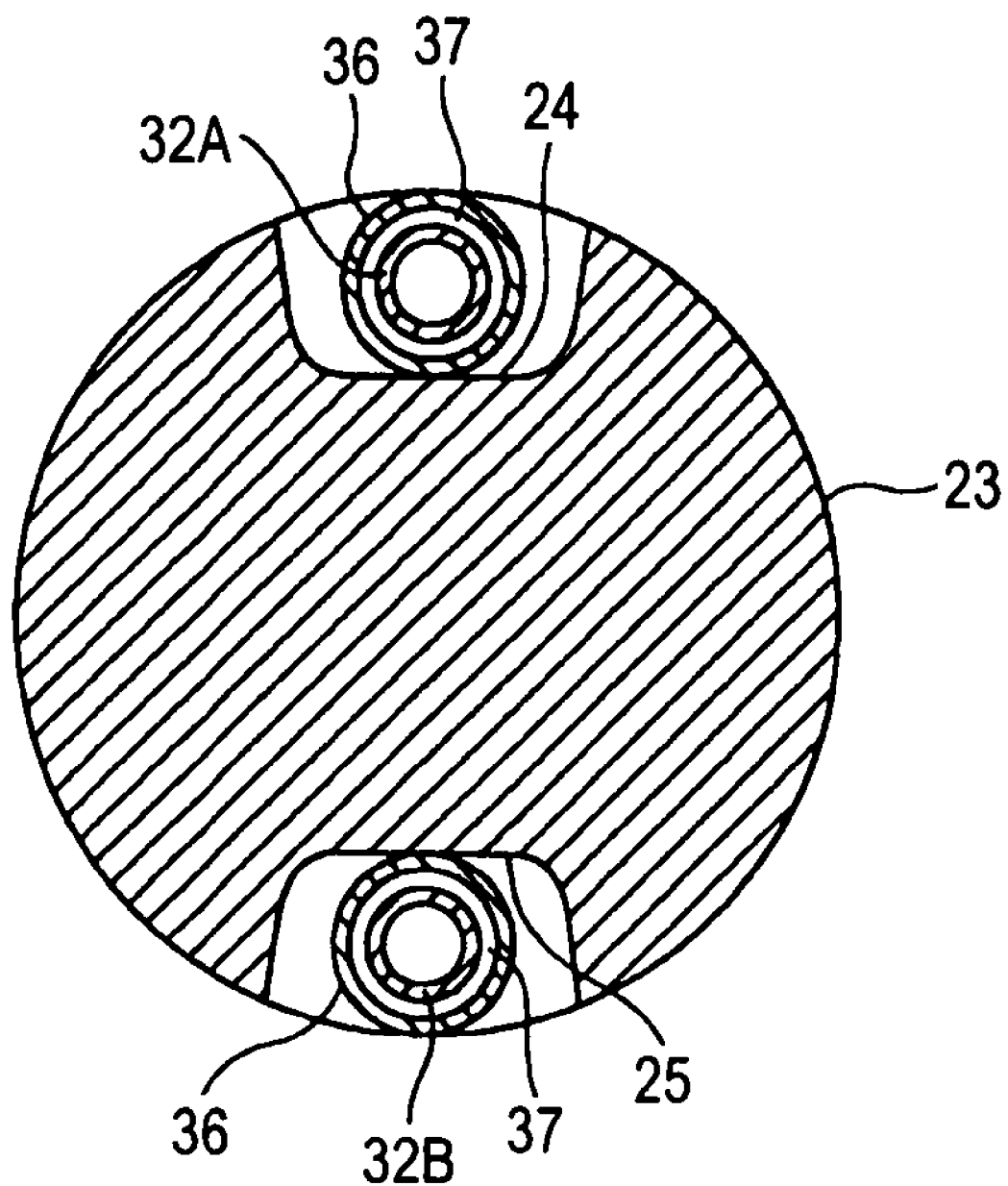
FIG. 3 is a sectional view of a rotating shaft extending from a rotor.

As shown in FIGS. 2 and 3, a pair of grooves 24 and 25 is concavely formed along the entire length in an axial direction of the rotor 17, symmetrically with respect to the central axis of the rotating shaft 23. The pair of grooves 24 and 25 (a first groove section and a second groove section) is coupled to each other at a position corresponding to an end portion of the rotor 17 (the left side in FIG. 1) through a groove 26 (a coupling section) that is concavely provided along the circumferential direction of the rotating shaft 23. A refrigerant circulation pipe 33, in which liquid nitrogen is circulated, is disposed inside these grooves 24, 25, and 26.

An outgoing path section 33A and a returning path section 33B of the refrigerant circulation pipe 33 are disposed inside the pair of grooves 24 and 25, respectively. A turnaround section 33C, through which the refrigerant circulation pipe 33 is turned from the outgoing path section 33A to the returning path section 33B, is disposed inside the groove 26 provided between the grooves 24 and 25. The liquid nitrogen serving as a refrigerant circulates through the refrigerant circulation pipe 33 including the outgoing path section 33A, the returning path section 33B, and the turnaround portion 33C that are continuously formed, whereby the superconducting coil 22 attached to the rotor 17 is cooled.

Together with the refrigerant circulation pipe 33, a first pipe 31 and a second pipe 32 communicated with the first pipe 31 are provided as cooling means.

The first pipe 31 has an outgoing path section 31A and a returning path section 31B, which are coupled to a liquid nitrogen tank 11 serving as a supply source of a refrigerant (the liquid nitrogen in the embodiment) for cooling the superconducting coil.

The refrigerant for cooling the superconducting coil is not limited to liquid nitrogen, and neon and helium may be used as the refrigerant.

The second pipe 32 also has an outgoing path section 32A and a returning path section 32B, which are respectively communicated with and are rotatably coupled to the outgoing path section 31A and the return passage 31B of the first pipe 31. The second pipe 32 is fixed to one of the axial ends of the rotating shaft 23, and as shown in FIG. 3, a part of the second pipe 32 extending from the one end of the rotating shaft 23 to the rotor 17 is disposed inside the grooves 24 and 25 that are concavely provided on the rotating shaft 23.

Outer circumferential surfaces of the first pipe 31 and the second pipe 32 are surrounded with outer-tubes 34 and 36 for vacuum insulation, thereby providing heat insulating means having vacuum heat-insulating layers 35 and 37.

As described above, as for the refrigerant circulation pipe 33 disposed inside the grooves 24, 25, and 26 of the rotating shaft 32, the outgoing path section 33A and the returning path section 33B are communicated with the outgoing path section 32A and the returning path section 32B of the second pipe, respectively. No heat insulating means is provided for the refrigerant circulation pipe 33 so that the superconducting coil 22 is cooled by a cold heat of the liquid nitrogen at this non-adiabatic portion, the cold heat being transmitted through the rotor 17.

Figure 4:
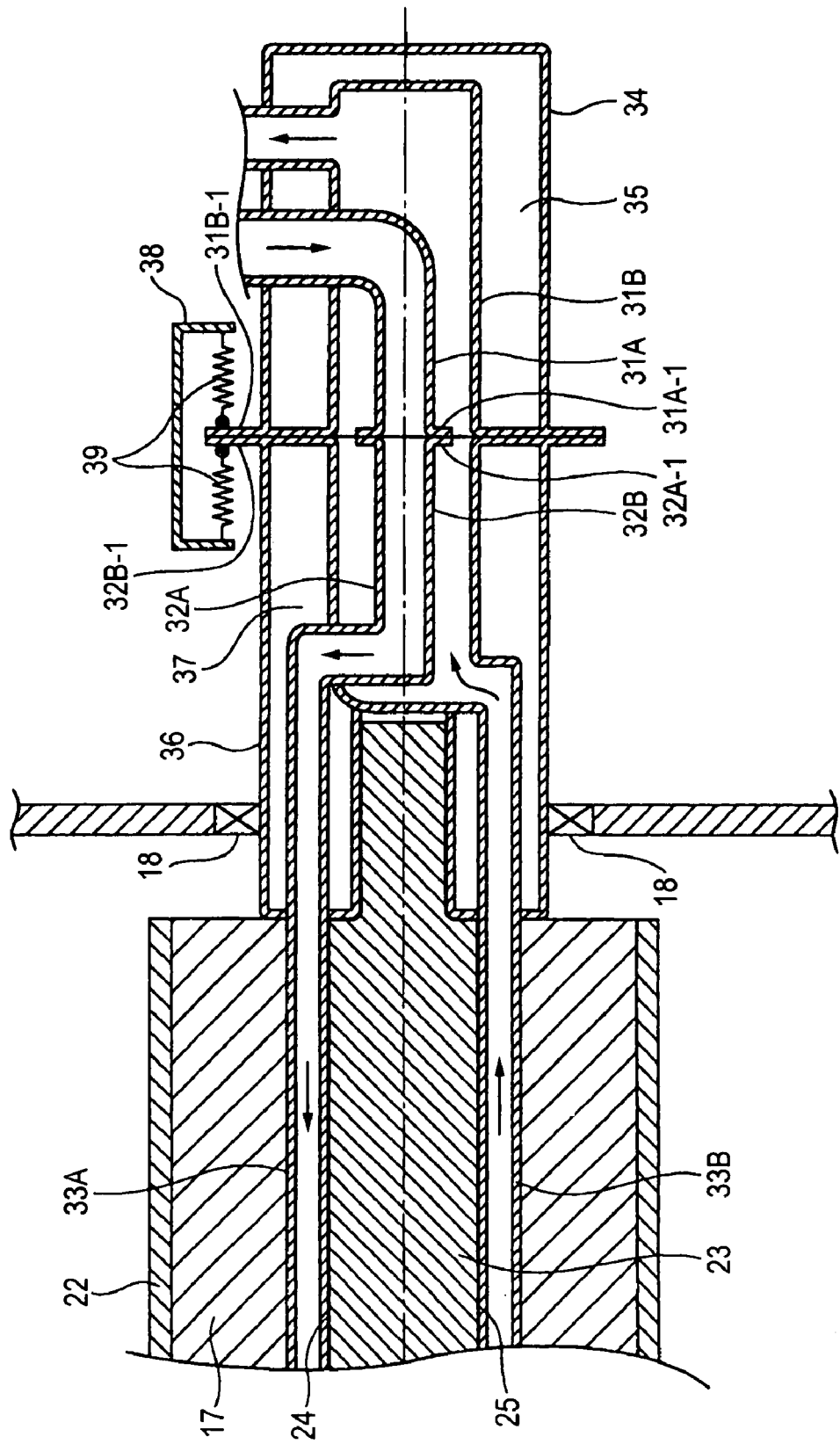
FIG. 4 is an enlarged sectional view of relevant portions showing coupling ends of a first pipe and a second pipe.

More specifically, as shown in FIG. 4, a coupling end of the first pipe 31, which is coupled to the second pipe 32, is disposed such that the outgoing path section 31A is placed on the same line as the center line of the rotating shaft 23, the outer circumference of the returning path section 31A is surrounded by the returning path section 31B, and the outer circumference of the returning path section 31B is surrounded by the outer-tube 34 for vacuum insulation.

Similarly, a coupling end of the second pipe 32, which is coupled to the first pipe 31, is disposed such that the outgoing path section 32A is placed on the same line as the centerline of the rotating shaft 23, the outer circumference of the returning path section 32A is surrounded by the returning path section 32B, and that the outer circumference of the returning path section 32B is surrounded by the outer-tube 36 for vacuum insulation.

Thus, at the coupling ends of the first pipe 31 and the second pipe 32, the outgoing path section 31A and the returning path section 31B of the first pipe 31 are disposed face the outgoing path section 32A and the returning path section 32B of the second pipe 32, respectively. Consequently, the liquid nitrogen flowing out from the liquid nitrogen tank 11 circulates the outgoing path section 31A of the first pipe 31, the outgoing path section 32A of the second pipe 32, the refrigerant circulation pipe 33, the returning path section 32B of the second pipe 32, and the returning path section 31B of the first pipe 31 in this order.

At the coupling ends of the first pipe 31 and the second pipe 32, flanges 31A-1, 31B-1, 32A-1 and 32B-1 are provided to protrude towards the outer circumferential side, and the flanges 31A-1 and 32A-1 are made to contact against each other while the flanges 31B-1 and 32B-1 are made to contact against each other. The flanges 31B-1 and 32B-1 contacting against each other are covered with a cover 38, and springs 39 attached inside the cover 38 pushes the flanges 31B-1 and 32B-1 in respective contacting directions from respective sides.

According to the above configuration, instead of providing a hollow portion in the center of the rotating shaft 23, the grooves 24, 25, and 26 are provided on the outer surface of the rotating shaft 23, and the refrigerant circulation pipe 33, in which the liquid nitrogen serving as the refrigerant is circulated, is disposed inside the grooves 24, 25, and 26. Thus, the cooling structure can easily be formed, as compared with the case where a hollow portion is provided in the rotating shaft 23.

Moreover, since the refrigerant circulation pipe 33 is placed closer to the outer surface than the case where the refrigerant circulation pipe 33 is provided on the center line of the rotating shaft 23, the refrigerant circulation pipe 33 can be disposed closer to the superconducting coil 22 so that a cooling effect can be enhanced.

Figure 5:
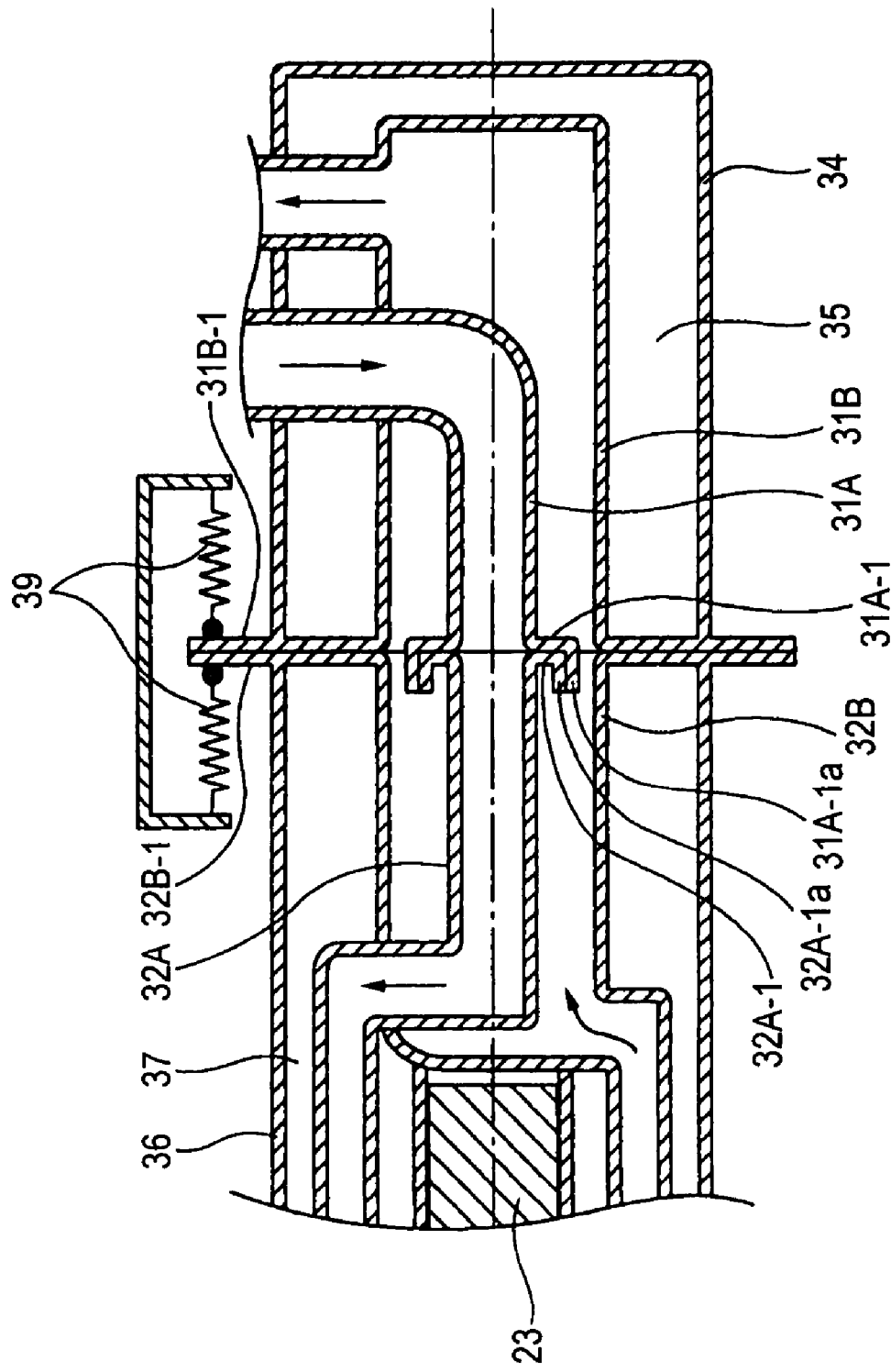
FIG. 5 is a sectional view showing a modified example of the first embodiment.

As shown in FIG. 5, an end 31A-1a of the flange 31A-1 projecting at the coupling end of the outgoing path section 31A of the first pipe 31 and an end 32A-1a of the flange 32A-1 projecting at the coupling end of the outgoing path section 32A of the second pipe 32 may be bent toward the rotor so that the end 32A-1a of the flange 32A-1 is covered with the end 31A-1a of the other flange 31A-1, whereby a refrigerant leakage at the coupling portions can be more surely prevented.

Figure 6:
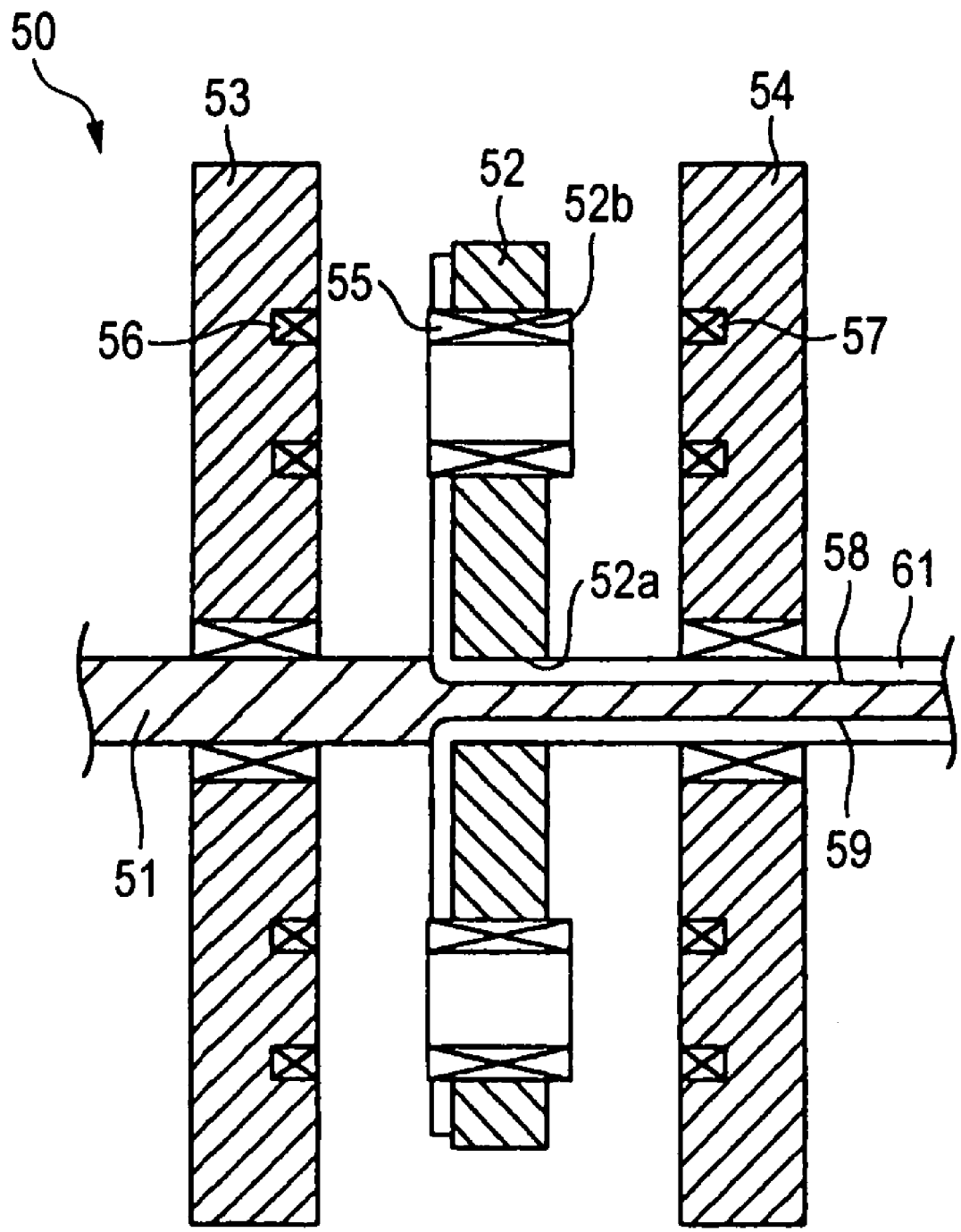
FIG. 6 is a sectional view of a superconducting motor according to a second embodiment.
Figure 7:
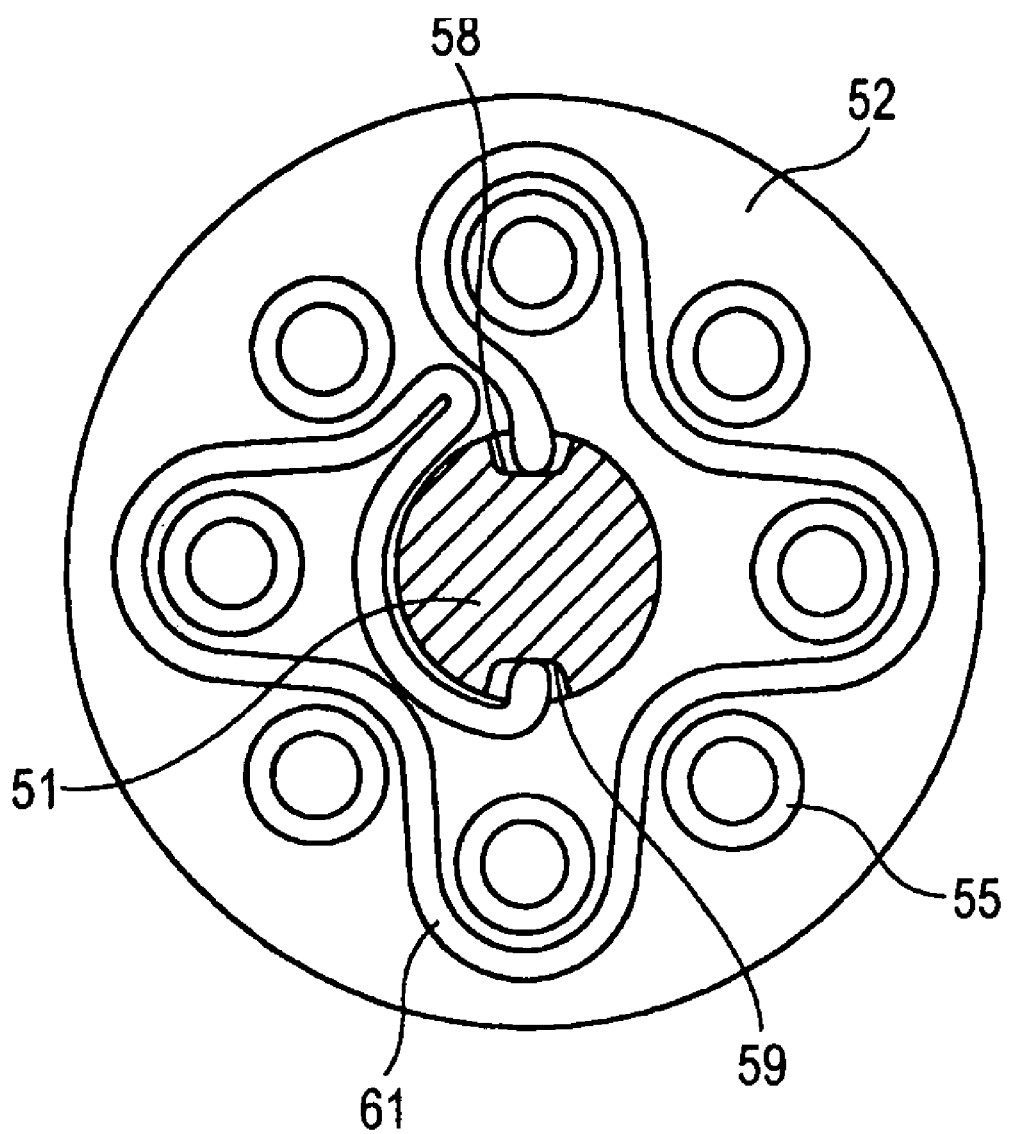
FIG. 7 is a view showing a rotor of the superconducting motor according to the second embodiment.

FIGS. 6 and 7 show a second embodiment of the invention.

The difference from the first embodiment is that the second embodiment is a motor of an axial type in which the stators are placed opposite to each other in the axial direction of the rotor, whereby a direction of a magnetic flux of the superconducting coil is directed in the axial direction.

In a superconducting motor 50 according to this embodiment, a pair of stators 53 and 54 is arranged so as to face each other on respective sides a rotor 52 fixed to a rotating shaft 51 with a predetermined gap being provided the respective sides of the rotor 52.

The rotor 52 is formed with a through hole 52a at a shaft center portion thereof, and the rotating shaft 51 is inserted through and fixed to the through hole 52a, whereby the rotor 52 and the rotating shaft 51 are corotated.

Magnetic field element mounting holes 52b are formed on the rotor 52 at intervals in a circumferential direction around the axis thereof. Superconducting coils 55 for magnetic field are fitted into and fixed in each of the magnetic field element mounting holes 52b so that the direction of the magnetic flux is directed in the axial direction.

The rotating shaft 51 penetrates though symmetrical disk-shaped stators 53 and 54 via bearings. A plurality of armature coils 56 and 57 formed of normal conducting materials (e.g., copper wires) is arranged on the surfaces of the stators 53 and 54 at intervals in a circumferential direction around the axis thereof. One end of each of the armature coils 56 and 57 is fixed to the surface of the stator 53 or 54 on a side facing the rotor with an adhesive agent, and the armature coils 56 and 57 are protruded toward the rotor 52 in the axial direction.

Similarly to the first embodiment, grooves 58 and 59 are concavely provided on an outer surface of the rotating shaft 51 at symmetrical positions, but a circumferential groove of the first embodiment which couples the grooves 58 and 59 is not provided. Alternatively, a refrigerant circulation pipe 61 of the refrigerant circulation tube disposed inside the grooves 58 and 59 is drawn out from the groove at a groove end on the side of the rotor 52, and is arranged to extend along a side surface of the rotor 52. The refrigerant circulation pipe 61 is alternately arranged on an outer side (a circumferential edge side of the rotor 52) and an inner side (a side of the rotating shaft 51) of the superconducting coils 55 attached to the rotor 52 so as to be disposed in the vicinity of the superconducting coil 55. Namely, as shown in FIG. 7, the refrigerant circulation pipe 61 is arranged through a space between the adjacent superconducting coils 55, a space between the superconducting coil 55 and the circumferential edge of the rotor 52, a space between the adjacent the superconducting coils 55, and a space between the superconducting coil 55 and the rotating shaft 51 in this order. The refrigerant circulation pipe 61 may be attached to the side surface of the rotor 52 with an adhesive agent, or may be disposed inside a groove formed on the rotor 52.

According to the above configuration, even for the axial-type motor, the superconducting coil attached to the rotor can be cooled by the cooling structure that is formed by disposing the refrigerant circulation pipe inside the groove provided on the outer surface of the rotating shaft. Also, because the refrigerant circulation pipe 61 is drawn out from the grooves 58 and 59 on the rotating shaft 51, and the drawn-out refrigerant circulation pipe 61 is disposed in the vicinity of the superconducting coils 55, the cooling effect the superconducting coils 55 can be enhanced.

Since the first pipe, the second pipe, and the remaining configurations of the refrigerant circulation tube are similar to those of the refrigerant circulation tube of the first embodiment, explanation thereof will be omitted.

Figure 8:
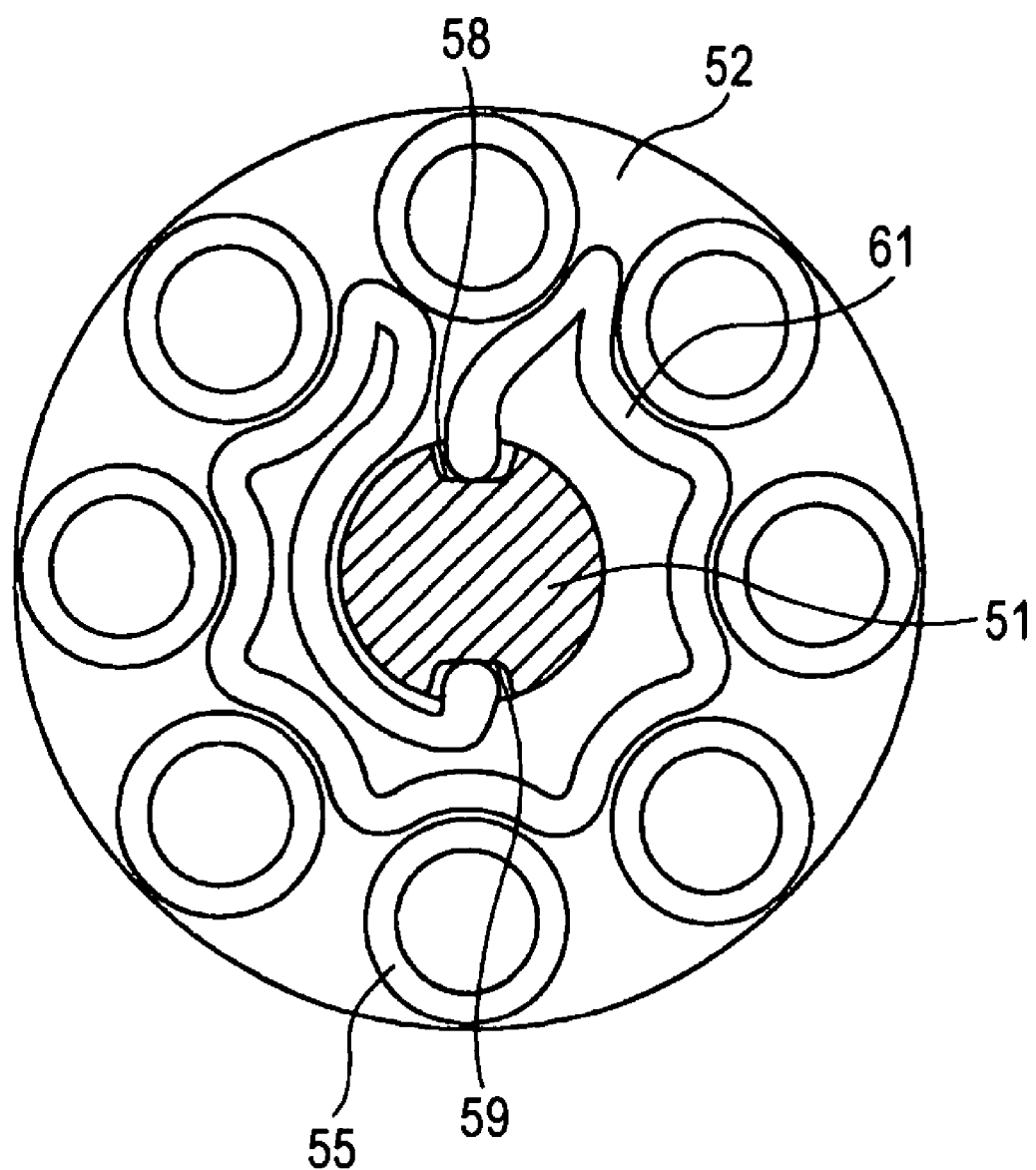
FIG. 8 is a view showing a rotor of a superconducting motor according to a modified example of the second embodiment.

FIG. 8 shows a modified example of the second embodiment.

In this modified example, superconducting coils 55 are attached along the circumference of a rotor 52. A refrigerant circulation pipe 61 drawn out form grooves 58 and 59 of a rotating shaft 51 is arranged along an inner side (a side of the rotating shaft 51) of the superconducting coils 55.

According to the above configuration, the refrigerant circulation pipe 61 is disposed in the vicinity of the superconducting coils 55 so that the cooling effect the superconducting coils 55 can be enhanced.

INDUSTRIAL APPLICABILITY

The motor device according to the present invention can suitably be used as a power source for large ships or the like which require high power output. Specifically, when an axial gap type of motor as shown in FIG. 6 is applied for a series-coupled synchronous type configuration, in which stators and rotors are alternately stacked on a rotating shaft so that the stators and the rotors are arranged in a high density, and in which high temperature superconducting bulk magnets are attached to the respective rotors and are cooled by a refrigerant circulated through a refrigerant circulation tube provided on the rotating shaft, high-power output of the motor can be maintained. Accordingly, such a motor can suitably be used as a propulsion motor for large ships, such as a government ship or a passenger ship.

The invention claimed is:

1. A cooling structure of a superconducting motor having a superconducting coil attached to a rotor, the cooling structure comprising:
 a rotating shaft penetrating through and fixed to the rotor; and
 a refrigerant circulation tube through which a refrigerant for cooling the superconducting coil circulates,
 wherein a groove is formed on an outer surface of the rotating shaft, and the refrigerant circulation tube is disposed inside the groove, wherein the refrigerant circulation tube includes:
- a first pipe having a first outgoing path section and a first returning path section that are coupled to a supply source of the refrigerant for cooling the superconducting coil;
- a second pipe having a second outgoing path section communicated with the first outgoing path section of the first pipe and a second returning path section communicated with the first returning path section of the first pipe, wherein the second pipe is fixed to an axial end of the rotating shaft and is rotatably coupled to the first pipe; and
- a refrigerant circulation pipe having a third outgoing path section communicated with the second outgoing path section of the second pipe and a third returning path section communicated with the second returning path section of the second pipe.

2. The cooling structure of the superconducting motor according to claim 1, wherein the groove includes a first longitudinal groove section, a second longitudinal groove section, and a coupling groove section,
- the first longitudinal groove section and the second longitudinal groove section are formed along an axial direction of the rotating shaft at symmetric positions with respect to an axis of the rotating shaft, and
- the coupling groove section is formed along a circumferential surface of the rotating shaft at a front end position of the rotor,
- wherein the refrigerant circulation pipe further has a turn-around section which is disposed inside the coupling groove section and couples the third outgoing path section and the third returning path section.

3. The cooling structure of the superconducting motor according to claim 1, wherein circumferential surfaces of the first pipe and the second pipe are surrounded by heat-insulating means.

4. The cooling structure of the superconducting motor according to claim 3, wherein the heat insulating means includes an outer tube surrounding the first pipe and the second pipe, the outer tube providing a vacuum heat-insulation.

5. The cooling structure of the superconducting motor according to claim 1, further comprising a first flange projected from a coupling end of the first pipe and a second flange projected from a coupling end of the second pipe, the first and the second flanges being rotatably in contact with each other; and
- spring means for biasing the first and the second flanges in respective contacting directions.

6. The cooling structure of the superconducting motor according to claim 1, wherein the refrigerant includes liquid nitrogen, neon, or helium.

7. The cooling structure of the superconducting motor according to claim 1, wherein the superconducting motor is of an axial type or a radial type.

* * * * *